United States Patent [19]

Weide et al.

[11] Patent Number: 5,352,281
[45] Date of Patent: Oct. 4, 1994

[54] USE OF AZO PIGMENT PREPARATIONS FOR SOLVENT-CONTAINING PACKAGING INTAGLIO AND FLEXOGRAPHIC PRINTING INKS

[75] Inventors: Joachim Weide, Kelkheim; Hans J. Metz, Darmstadt; Ruediger Jung, Kelkheim; Rainer Winter, Oberursel, all of Fed. Rep. of Germany

[73] Assignee: Hoechst Aktiengesellschaft, Frankfurt am Main, Fed. Rep. of Germany

[21] Appl. No.: 115,445

[22] Filed: Sep. 1, 1993

[30] Foreign Application Priority Data

Sep. 2, 1992 [DE] Fed. Rep. of Germany ....... 4229206

[51] Int. Cl.$^5$ .............................................. C09D 11/10
[52] U.S. Cl. .................................. 106/20 R; 106/493; 106/496; 106/498; 106/499
[58] Field of Search ............... 106/493, 496, 498, 499, 106/20 R, 23 C, 23 H, 23 K

[56] References Cited

U.S. PATENT DOCUMENTS

| | | | |
|---|---|---|---|
| 3,674,527 | 7/1972 | Komander et al. | 106/402 |
| 3,998,652 | 12/1976 | Aign et al. | 106/499 |
| 4,461,647 | 7/1984 | Schofield et al. | 106/494 |
| 4,515,639 | 5/1985 | Dopfer et al. | 106/496 |
| 4,828,622 | 5/1989 | Weide et al. | 106/412 |
| 4,960,935 | 10/1990 | Dietz et al. | 564/325 |

FOREIGN PATENT DOCUMENTS

| | | |
|---|---|---|
| 1158384 | 12/1983 | Canada . |
| 0017189 | 5/1983 | European Pat. Off. . |
| 0057880 | 3/1985 | European Pat. Off. . |
| 0076024 | 9/1985 | European Pat. Off. . |
| 0138104 | 11/1989 | European Pat. Off. . |
| 0180870 | 3/1990 | European Pat. Off. . |
| 2001505 | 7/1970 | Fed. Rep. of Germany . |
| 2421606 | 9/1977 | Fed. Rep. of Germany . |
| 2730223 | 1/1979 | Fed. Rep. of Germany . |
| 3026127 | 2/1982 | Fed. Rep. of Germany . |
| 583149 | 12/1977 | U.S.S.R. . |

OTHER PUBLICATIONS

World Surface Coatings Abstracts, vol. 52, No. 444, "Printing ink for transfer self adhering reproductions", Jun. 1979.
Derwent Abstract AN-78-77897A/43 of USSR 583,149 Dec. 1977.

Primary Examiner—Karl Group
Assistant Examiner—Scott L. Hertzog

[57] ABSTRACT

Mono- and disazo pigments from the group of the acetoacetarylide, pyrazolone, β-naphthol, 2-hydroxy-3-naphthanilide, 2-hydroxynaphthoic acid, benzimidazolone, diaryl yellow, diarylpyrazolone and disazobenzimidazolone pigments in whose preparation a nonionic surfactant which has a cloud point in aqueous solution was added at the latest immediately prior to the isolation, excluding pigments which have a bis-(acetoacetylamino)benzene coupling component, are useful for pigmenting solvent-containing packaging intaglio and flexographic printing inks.

15 Claims, No Drawings

USE OF AZO PIGMENT PREPARATIONS FOR SOLVENT-CONTAINING PACKAGING INTAGLIO AND FLEXOGRAPHIC PRINTING INKS

DESCRIPTION

Use of azo pigment preparations for solvent-containing packaging intaglio and flexographic printing inks The present invention relates to the field of azo pigment preparations. It is known from EP-A-138104, U.S. Pat. No. 4,515,639 and U.S. Pat. No. 4,461,647 to coat pigment surfaces with various assistants, such as resins, long-chain aliphatic amines or synergists, to optimize the application properties, such as color strength, gloss, transparency and rheology, specifically for the intended field of use. The pigment preparations are usually isolated from aqueous media. To incorporate pigments or pigment preparations into printing inks using the customary dispersing machines such as bead mills and stirred three-roll mills, the dried pigments or pigment preparations have to be pulverized in suitable grinding machines such as air jet mills, pin mills or impact disk mills.

It has been found in the industry that especially pigment preparations having a high resin content, which are incorporated into the solvent-containing packaging intaglio and flexographic printing inks, are very sensitive to grinding and that, in grinding, their coloristic advantages due to preparation are largely lost again. Pigment powders having a tolerable sieve residue of less than 1% in wet sieving through a 64 μm sieve lead on incorporation into nitrocellulose intaglio printing inks to weak, hiding, and matt prints. Only mill bases having a sieve residue of more than 20% produce coloristically satisfactory prints of high gloss or high transparency. Sieve residues of this order of magnitude however, are difficult to produce consistently on an industrial scale, and lead to appreciable dispersion problems in printing ink making.

It is an object of the present invention to reduce the grind sensitivity of mono- and disazo pigment preparations to such an extent that the above-described disadvantages are avoided on incorporation into solvent-containing packaging intaglio and flexographic printing inks.

It was found that an additional surface coating of the prepared azo pigments with nonionic surfactants which have a cloud point in water can surprisingly reduce the grind sensitivity of the dried azo pigment preparations to such an extent that the excellent coloristic properties due to the preparation are retained in solvent-containing packaging intaglio and flexographic printing inks even after grinding, for example in an industrial jet or pin mill.

The present invention accordingly provides a method of using mono- or disazo pigments or a preparation of the said pigments from the group of the acetoacetarylide pigments, pyrazolone pigments, β-naphthol pigments, 2-hydroxy-3-naphthanilide pigments, 2-hydroxynaphthoic acid pigments, benzimidazolone pigments, diaryl yellow pigments, diarylpyrazolone pigments and disazobenzimidazolone pigments, subject to the proviso that pigments which have bis(acetoacetylamino)benzene or derivatives thereof as coupling component shall be excluded, the pigments or pigment preparations having been prepared by adding at least one nonionic surfactant which has a cloud point in aqueous solution at the latest immediately prior to the isolation of the mono- or disazo pigment, for pigmenting solvent-containing packaging intaglio and flexographic printing inks.

The pigments of the aforementioned groups are described for example in W. Herbst, K. Hunger, Industrielle Organische Pigmente, VCH-Verlag, 1987.

As used herein, pigment preparation means that further assistants, such as anionic or cationic surface-active substances or natural or synthetic resins or resin derivatives, have been added to the pigment. Furthermore, it can be advantageous for the preparation of the disazo pigments to be carried out in the presence of customary additives, for example those which have a favorable influence on the rheological properties of the printing inks prepared from the pigments.

The method of the invention can also be carried out with a mixture of a plurality of said pigments.

The pigments contemplated for the purposes of the invention are composed of the diazo and coupling components mentioned hereinafter.

Suitable diazo components are diazotizable aromatic amines, in particular anilines and benzidines, which are unsubstituted or mono- or polysubstituted. Examples of aromatic amines which are of interest for preparing the azo pigments used according to the invention are aniline and benzidine and also substituted anilines and benzidines, preferably aniline or benzidine having from 1 to 3 substituents selected from the group consisting of $C_1$–$C_4$-alkyl, in particular methyl or ethyl, $C_1$–$C_4$-alkoxy, in particular methoxy or ethoxy, phenoxy, halophenoxy, carboxyl, carbalkoxy such as carbomethoxy, carboethoxy, carbopropoxy, carboisopropoxy or carbobutoxy, acyl, in particular acetyl or benzoyl, acyloxy, in particular acetoxy, acylamino, in particular acetylamino or benzoylamino, unsubstituted or N-mono- or N,N-disubstituted carbamoyl or unsubstituted or N-mono- or N,N-disubstituted sulfamoyl, with $C_1$–$C_4$-alkyl or mono-substituted, disubstituted or trisubstituted phenyl or an unsubstituted or substituted aromatic heterocycle coming into consideration as substituents, $C_1$–$C_4$-alkylamino or phenylamino, $C_1$–$C_4$-alkylsulfonyl or phenylsulfonyl, phenylsulfonylamino, sulfo, cyano, halogen, in particular chlorine or bromine, nitro and trifluoromethyl.

Examples of substituted anilines and benzidines in this context are dimethyl aminoterephthalate, dimethyl aminoisophthalate, anthranilic acid, 2-trifluoromethylaniline, 2,5-dichloroaniline, 2,4-dichloroaniline, 2,4,5-trichloroaniline, 2-methyl-4-chloroaniline, 2-chloro-5-trifluoromethylaniline, 2-chloro-4-nitroaniline, 2-nitroaniline, 4-nitroaniline, 2-methyl-5-nitroaniline, 2-methyl-4-nitroaniline, 2,2'5,5'-tetrachlorobenzidine, 3,3'-dichlorobenzidine, 3,3'-dimethoxybenzidine, 2,5-dimethoxy-4-aminophenylsulfanilide, 2-sulfo-4-chloro-5-methylaniline, 2-nitro-4-chloroaniline, 2-nitro-4-methylaniline, 2,4-dinitroaniline, 3-amino-4-chlorobenzamide, 3-amino-4'-carbomethoxybenzoyl-2,5-dichloroaniline, 4-aminobenzamide, butyl 2-aminobenzoate, 3'-amino-4'-anisoyl-4-aminobenzamide, methyl 2-aminobenzoate, 2-methyl-5-methoxy-4-aminophenylsulfmethylamide, 2,5-dimethoxy-4-aminophenylsulfmethylamide, 2-methoxy-4-nitroaniline, 2-methoxy-5-diethylsulfamidoaniline, 2-sulfo-4-chloro-5-carboxyanilide, 3-carbanilido(4'-sulfo)aniline, 2-sulfoaniline and 2-methoxy-5-carbanilidoaniline.

Examples of coupling components for the azo pigments used according to the invention are β-naphthol, 1-acetoacetylamino-2-methylbenzene, 1-acetoacetylamino-2-chlorobenzene, 5-acetoacetylamino-benzimidazolone, 5-(2'-hydroxy-3'-naphthoyl)-aminobenzimidazolone, 1-acetoacetylamino-2-methyl-5-chlorobenzene, 1-acetoacetylamino-2,4-dichlorobenzene, 1-(2'-hydroxy-3'-naphthoylamino)-4-acetylaminobenzene, 1-(2'-hydroxy-3'-naphthoylamino)-2-methoxybenzene, 1-(2'-hydroxy-3'-naphthoylamino)-2-ethoxybenzene, 1-(2'-hydroxy-3'-naphthoylamino)-2,4-dimethoxy-5-chlorobenzene, 3,3'-dimethyldiacetoacetylbenzidine, 1-acetoacetylamino-2-methoxybenzene, acetoacetylaminobenzene, 1-acetoacetylamino-2,4-dimethylbenzene, 1-acetoacetylamino-2,5-dimethoxy-4-chlorobenzene, 1-acetoacetylamino-2,4-dimethoxy-5-chlorobenzene, 1-phenyl-5-pyrazolone, 1-phenyl-3-carboethoxy-5-pyrazolone, 1-(4'-methyl)phenyl-3-methyl-5-pyrazolone, 1-phenyl-3-methyl-5-pyrazolone, 1-(2'-hydroxy-3'-naphthoylamino)-4-methylbenzene, 1-(2'-hydroxy-3'-naphthoylamino)-benzene, 1-(2'-hydroxy-3'-naphthoylamino)-2-methylbenzene, 1-(2'-hydroxy-3'-naphthoylamino)-2-methyl-4-chlorobenzene, 1-(2-hydroxy-3'-naphthoylamino)-4-chlorobenzene, 1-(2'-hydroxy-3'-naphthoylamino)-2-methyl-5-chlorobenzene, 1-(2'-hydroxy-3'-naphthoylamino)-2,5-dimethoxy-4-chlorobenzene and 2-hydroxy-3-naphthanilide.

Particularly preferred coupling components are β-naphthol, 1-acetoacetylamino-2-methylbenzene, 1-acetoacetylamino-2-chlorobenzene, 5-acetoacetylaminobenzimidazolone, 5-(2'-hydroxy-3'-naphthoyl)aminobenzimidazolone, 1-(2'-hydroxy-3'-naphthoylamino)-2-methoxybenzene, 1-(2'-hydroxy-3'-naphthoylamino)-2-ethoxybenzene, 1-acetoacetylamino-2-methoxybenzene, acetoacetylaminobenzene, 1-acetoacetylamino-2,4-dimethylbenzene, 1-acetoacetylamino-2,5-dimethoxy-4-chlorobenzene, 1-acetoacetylamino-2,4-dimethoxy-5-chlorobenzene, 1-(4'-methyl)phenyl-3-methylpyrazolone or 1-phenyl-3-methyl-5-pyrazolone.

The nonionic surfactant used, the amount of surfactant required and the time of addition depend on the chemical constitution, the specific surface area of the particular pigment, the specific process conditions and the pigment preparation requirements.

A suitable nonionic surfactant has to have a cloud point in aqueous solution. The cloud point of said surfactants in water is preferably between 5° and 90° C., in particular between 20° and 70° C. The cloud points are determined in accordance with DIN 53917. The amount of surfactant to be used is between 1 and 20 parts by weight, preferably 3 and 15 parts by weight, based on 100 parts by weight of pigment, pigment mixture or pigment preparation.

A multiplicity of nonionic surfactants of different structures are suitable, provided they have a cloud point in water. Surfactants which meet these requirements are described for example in U.S. Pat. No. 4,828,622. Of particular suitability are nonionic alkoxylates of alcohols, fatty alcohols, phenols, alkylphenols, naphthols and alkylnaphthols with ethylene oxide and/or block polymers of ethylene oxide and propylene oxide. The level of the cloud point of such compounds depends on the length of the polyalkylene oxide chain, and can be varied in the synthesis of the surfactants via the amount of ethylene oxide and/or propylene oxide used.

Of particular interest are compounds having a poly(ethyleneoxy) chain or a poly(ethyleneoxy)poly(methylethyleneoxy) chain which are joined by an oxygen or nitrogen atom to radicals of the following kind:

aliphatic or cycloaliphatic, primary or secondary, saturated or unsaturated alkyl radicals of from 6 to 26 carbon atoms, particularly preferably alkyl radicals having a chain length of from 10 to 18 carbon atoms, for example nonyl, decyl, undecyl, dodecyl, tridecyl, tetradecyl, pentadecyl, hexadecyl, heptadecyl, octadecyl, 2-butyloctyl, 2-phenyloctyl, 2-hexyldecyl, 2-heptylundecyl, 2-octyldodecyl, 2-nonyltridecyl, 2-decyltetradecyl, 10-undecenyl, oleyl, 9-octadecenyl, linoleyl or linolenyl radicals;

aromatic radicals such as substituted or unsubstituted phenyl or alkylphenyl having up to three primary or secondary $C_4$-$C_{12}$-alkyl radicals, preferably hexylphenyl, heptylphenyl, octylphenyl, nonylphenyl, undecylphenyl, dodecylphenyl, isononylphenyl, tributylphenyl or dinonylphenyl, and phenyl substituted by further aromatic radicals, such as benzyl-p-phenylphenyl;

naphthyl or $C_1$-$C_4$-alkylnaphthyl, preferably α-naphthyl or β-naphthyl or alkyl-β-naphthyl having from 1 to 3 unbranched or branched $C_1$-$C_{16}$-alkyl groups, for example methyl, butyl, octyl, nonyl, decyl, dodecyl or tetradecyl;

unsubstituted or $C_1$-$C_{18}$-alkyl-monosubstituted, -disubstituted or -trisubstituted heterocyclic radicals or alkyl substituted by from 1 to 3 heterocyclic radicals, for example 2-[2-(8-heptadecen-1-yl)-4,5-dihydro-1-imidazolyl]ethyl. Heterocyclic radicals include not only cycloaliphatic but also aromatic radicals.

Also of particular interest are mixtures of the aforementioned compounds and in particular mixtures as obtained in the alkoxylation, with ethylene oxide and/or propylene oxide, of synthetic fatty alcohols from the oxo process or of fatty alcohols from natural raw materials following fat cleavage and reduction. Suitable natural raw materials are coconut oil, palm oil, cottonseed oil, sunflower oil, soybean oil, linseed oil, rapeseed oil, tallow and fish oil.

Also of particular interest are alkoxylated, higher molecular weight surface-active agents, for example the condensation products of phenols, alkanols, alkylene oxide and carboxylic acids described in DE-A-2,730,223, the bisphenol derivatives described in U.S. Pat. No. 4,960,935, the condensation products of phenols, formaldehyde, amines and alkylene oxide described in U.S. Pat. No. 3,998,652, and also the water-soluble alkoxylation products described in CA-A-1,158,384, subject to the exclusion of those surface-active agents which do not have a cloud point in aqueous solution.

The nonionic surfactants or surfactant mixture used according to the invention can be added at various stages of synthesizing said pigments. For example, the addition can take place to the diazonium salt solution or to the solution or suspension of the coupling component prior to the azo coupling reaction. The addition can also take place at various times. Preference is given to making the addition prior to any heating-up of the pigment suspension. However, the addition of the nonionic surfactant has to take place at the latest prior to the isolation of the disazo pigment.

The coupling reaction for synthesizing said azo pigments is carried out in an aqueous medium in a conventional manner by a) adding a solution of the diazonium salt to a suspension or dispersion of the coupling component, or
b) simultaneously metering a solution of the diazonium salt and a solution, suspension or dispersion of the coupling component into a buffer solution or into a mixing nozzle, or
c) adding a solution of the coupling component to a solution of the diazonium salt, or
d) adding a suspension or dispersion of the coupling component to a solution of the diazonium salt.

The process parameters of time, temperature and pH differ only insignificantly from those of conventional coupling processes and are thus known to the person skilled in the art. In most cases it is advantageous to employ the coupling methods a) and d).

It can further be advantageous to carry out the coupling in the presence of customary coupling promoters, for example long-chain amine oxides and phosphine oxides.

Frequently it is advantageous for the as-coupled pigments to be heated for some time in the reaction mixture, if necessary under elevated pressure.

Furthermore, those of the mono- and disazo pigments mentioned which contain one or more lakeable acid groups such as sulfo or carboxyl groups can be converted into color lakes in a conventional manner.

The isolation of the pigment from the aqueous reaction mixture and the washing with water are effected at a temperature above the cloud point of the surfactant used. This makes it possible to wash away soluble by-products, such as salts, without significantly affecting the surfactant content of the product.

The binder basis of the printing inks prepared with said pigment preparations is predominantly nitrocellulose (NC), but combinations with small proportions of NC-compatible synthetic resins such as maleate resins, acrylate resins, rosins, polyamide resins and polyurethane resins are also used in industry.

In the Examples which follow, parts are by weight. Parts by volume bear the same relation to parts by weight as the liter to the kilogram.

EXAMPLES 1) 110 parts of 1-acetoacetylamino-2,4-dimethylbenzene are dissolved in 3000 parts of water and 74 parts of sodium hydroxide solution having a specific gravity of 1.31. After 2 mol of sodium acetate and 400 parts of ice have been added, 1.5 mol of 2N hydrochloric acid are slowly added.

To the coupling component thus synthesized is added, over 1.5 hours, a tetrazo solution prepared in a conventional manner at 15° C. from 63 parts of 3,3'-dichloro-4,4'-diaminobiphenyl. After the coupling has ended, the mixture is neutralized with dilute sodium hydroxide solution, and 46 parts of disproportionated rosin are added as a solution in sodium hydroxide solution at 70° C., and the mixture is heated to 98° C. by direct introduction of steam. After stirring for 1 hour, the mixture is cooled down to 70° C. and adjusted to pH 4 with 31% strength hydrochloric acid.

Then 20 parts of a $C_{12}$–$C_{15}$-fatty alcohol-ethylene oxide-propylene oxide adduct having a cloud point in water of 40°–42° C. are added in the form of a 10% strength aqueous solution, and the mixture is stirred for 30 minutes. The product is filtered off at 70° C., washed salt-free with hot water at a temperature of not less than 50° C., and subsequently dried at 60°–65° C. 236 parts are obtained of Pigment Yellow 13 (C.I. No. 21 100) in the form of a coarse granulation, which is ground in a pin mill to a pigment powder having a sieve residue (wet sieving through a 63 μm sieve) of <1%.

If the above-prepared pigment preparation is used for preparing a solvent-containing nitrocellulose intaglio printing ink and the prints prepared therewith are compared with a printing ink based on a corresponding pigment preparation without the surfactant treatment of the invention, it is found that the pigment preparation of the invention exhibits not only higher color strength but also distinctly improved transparency and distinctly higher gloss.

2) A coupling reaction is carried out at 20°–25° C. and at a pH between 4.0 and 4.2 to prepare an aqueous pigment dispersion of 480 parts of C.I. Pigment Red 146 in a final coupling volume of 13000 parts. 48 parts of a $C_{12}$–$C_{15}$ fatty alcohol-ethylene oxide-propylene oxide adduct having a cloud point in water at 40°–42° C. in the form of a 10% strength aqueous solution are added, the mixture is subsequently stirred for 30 minutes, then heated with direct steam to 60° C. and filtered hot, and the filter residue is washed salt-free with water at not less than 50° C. It is dried at 70° C. to leave 528 parts of a preparation of Pigment Red 146 in the form of a coarse granulation which is ground in a pin mill to a pigment powder having a sieve residue (wet sieving through a 63 μm sieve) of <1%.

If the above-prepared pigment preparation is used for preparing a solvent-containing nitrocellulose intaglio printing ink and the prints prepared therewith are compared with a printing ink based on a corresponding pigment preparation without the surfactant treatment of the invention, it is found that the pigment preparations of the invention exhibit not only higher color strength but also distinctly higher transparency and distinctly higher gloss.

Use Examples

Preparation of intaglio printing inks in a Paint Shaker and subsequent application to a printing stock.
1. Varnish

| | |
|---|---|
| 30.0% | of collodion wool A 400 (65% ethanol moist) |
| 4.0% | of plasticizer, for example dibutyl phthalate |
| 8.0% | of methoxypropanol |
| 58.0% | of ethanol (anhydrous) |
| 100.0% | (solids content 23.5%) |

2. Solvent mixture
50% ethanol
50% ethyl acetate
Sample and comparison are used to prepare 2 inks each by the following method:
Into a 150 ml plastic cup with a push-on lid are weighed 113 g of glass balls (2 mm diameter) and

| | |
|---|---|
| 5.4 g | of pigment |
| 15.0 g | of nitrocellulose (NC) varnish (1.) |
| 15.6 g | of solvent mixture (2.) |
| 36.0 g, | corresponding to a 15% strength millbase. |

2 cups at a time of sample and comparison are dispersed simultaneously on the shaker for 30 minutes.

3. Each cup of sample and comparison then has added to it 9.0 g of NC varnish (1.)

and is shaken for a further 2 minutes on the shaker. These now 12% strength concentrates are introduced via a sieve into a glass bottle and used for measuring the viscosity.

The other two cups of sample and comparison have each added to them 32.0 g of NC varnish (1.) and 4.0 g of methoxypropanol and are shaken for a further 2 minutes. These now 7.5% strength ready-prepared printing inks are freed of the glass balls and introduced into a glass bottle. Before printing the ink is left to stand for 10 minutes to allow air bubbles to escape.

5. Printing

The above-described 7.5% strength printing inks are printed with an intaglio printing test press once on paper and once on polypropylene (PP) film, sample and comparison side by side on the same medium.

Each print is immediately after printing placed for some seconds onto a hotplate at 60° C. to prevent blushing of the print.

6. Viscosity measurement

The measurement of viscosity is carried out on the above-described 12% strength concentrates (using for example a ®Rotovisko RV3 or RV12 or a ®Viskotester VT 500 from Haake, Karlsruhe).

7. Assessment

The print on paper is used to assess the color strength, the hue and the cleanness, the transparency being assessed with reference to the print on black.

The print on PP film (underlaid with paper) or aluminum foil is used to asses the gloss and the transparency.

If the color strength of the two inks differ more than 5%, the stronger ink (sample or grade) is appropriately reduced with varnish (1.), (for example to 95 parts, 90 parts, etc.), and again printed against the 2nd ink.

The pigments of the Examples and Comparative Examples are processed by the above-described procedure into printing inks, and these inks are used to produce prints.

What is claimed is:

1. A method of pigmenting solvent-containing packaging intaglio and flexographic printing inks comprising the step of preparing mono- or disazo pigments or a preparation of the said pigments from the group of the acetoacetarylide pigments, pyrazolone pigments, β-naphthol pigments, 2-hydroxy-3-naphthanilide pigments, 2-hydroxynaphthoic acid pigments, benzimidazolone pigments, diaryl yellow pigments, diarylpyrazolone pigments and disazobenzimidazolone pigments, subject to the proviso that pigments which have bis(acetoacetylamino)benzene or derivatives thereof as coupling component shall be excluded, by adding at least one nonionic surfactant which has a cloud point in aqueous solution at the latest immediately prior to the isolation of the mono- or disazo pigment and then incorporating said pigments or pigment preparations into said printing inks.

2. The method of claim 1, wherein the addition of the nonionic surfactant(s) takes place prior to azo coupling.

3. The method of claim 1, wherein the addition of the nonionic surfactant(s) takes place prior to a heating-up of the pigment suspension.

4. The method of claim 1, wherein the cloud point of the nonionic surfactant(s) in water is between 5° and 90° C.

5. The method of claim 1, wherein the cloud point of the nonionic surfactant(s) in water is between 20° and 70° C.

6. The method of claim 1, wherein the nonionic surfactant(s) is or are added in an amount of from 1 to 20 parts by weight, based on 100 parts by weight of pigment or pigment preparation.

7. The method of claim 1, wherein the nonionic surfactant(s) is or are added in an amount of from 3 to 15 parts by weight, based on 100 parts by weight of pigment or pigment preparation.

8. The method of claim 1, wherein the nonionic surfactant used is at least one compound from the group of the alkoxylates of alcohols, fatty alcohols, phenols, alkylphenols, naphthols or alkylnaphthols.

9. The method of claim 1, wherein the nonionic surfactant used is an ethylene oxide adduct or propylene oxide adduct with a fatty alcohol, phenol, alkylphenol, naphthol or alkylnaphthol.

10. The method of claim 1, wherein the nonionic surfactant used is a block polymer of ethylene oxide, propylene oxide or a mixture thereof.

11. The method of claim 1, wherein the nonionic surfactant is a mixture produced in the course of the alkoxylation of synthetic fatty alcohols from the oxo process or the alkoxylation of natural fatty alcohols.

12. The method of claim 11, wherein the natural fatty alcohols are those obtainable by fat cleavage and reduction of coconut oil, palm oil, cottonseed oil, sunflower oil, soybean oil, linseed oil, rapeseed oil, tallow or fish oil.

13. The method of claim 1, wherein the coupling component is β-naphthol, 1-acetoacetyl-amino-2-methylbenzene, 1-acetoacetylamino-2-chlorobenzene, 5-acetoacetylaminobenzimidazolone, 5-(2'-hydroxy-3'-naphthoyl)aminobenzimidazolone, 1-(2'-hydroxy-3'-naphthoylamino)-2-methoxybenzene, 1-(2'-hydroxy-3'-naphthoylamino)-2-ethoxybenzene, 1-acetoacetylamino-2-methoxybenzene, acetoacetylaminobenzene, 1-acetoacetylamino-2,4-dimethylbenzene, 1-acetoacetylamino-2,5-dimethoxy-4-chlorobenzene, 1-acetoacetylamino-2,4-dimethoxy-5-chlorobenzene, 1-(4'-methyl)phenyl-3-methylpyrazolone or 1-phenyl-3-methyl-5-pyrazolone.

14. The method of claim 1, wherein the binder base of the packaging intaglio and flexographic printing inks is nitrocellulose or a combination of nitrocellulose with small proportions of nitrocellulose-compatible synthetic resins.

15. The method of claim 14, wherein the nitrocellulose-compatible synthetic resins are maleate resins, acrylate resins, rosins, polyamide resins or polyurethane resins.

* * * * *